(12) United States Patent
Tanaka (10) Patent No.: US 7,241,239 B2
(45) Date of Patent: *Jul. 10, 2007

(54) AUTO TENSIONER

(75) Inventor: Katsushi Tanaka, Shizuoka (JP)

(73) Assignee: Showa Corporation, Saitama (JP)

( * ) Notice: Subject to any disclaimer, the term of this patent is extended or adjusted under 35 U.S.C. 154(b) by 586 days.

This patent is subject to a terminal disclaimer.

(21) Appl. No.: 10/802,219

(22) Filed: Mar. 18, 2004

(65) Prior Publication Data

US 2005/0064970 A1  Mar. 24, 2005

(30) Foreign Application Priority Data

Sep. 19, 2003 (JP) ............... 2003-328905

(51) Int. Cl.
F16H 7/08 (2006.01)
F16H 7/12 (2006.01)

(52) U.S. Cl. .............. 474/110; 474/109; 474/101

(58) Field of Classification Search ........... 474/101, 474/109–110, 133–138, 113–118
See application file for complete search history.

(56) References Cited

U.S. PATENT DOCUMENTS

| | | | |
|---|---|---|---|
| 4,790,801 A * | 12/1988 | Schmidt et al. ........... | 474/110 |
| 4,976,660 A | 12/1990 | Breindl | |
| 5,026,330 A * | 6/1991 | Zermati et al. ........... | 474/138 |
| 6,036,612 A * | 3/2000 | Katogi et al. ............ | 474/110 |
| 6,234,929 B1 * | 5/2001 | Rasche ................... | 474/110 |
| 6,352,487 B1 * | 3/2002 | Tada ...................... | 474/110 |
| 7,070,528 B2 * | 7/2006 | Emizu et al. ............ | 474/110 |
| 7,094,168 B2 * | 8/2006 | Tanaka ................... | 474/109 |
| 7,108,621 B2 * | 9/2006 | Ullein et al. ............ | 474/101 |

FOREIGN PATENT DOCUMENTS

| | | | |
|---|---|---|---|
| DE | 4039816 C1 * | 4/1992 | |
| EP | 1022487 A1 * | 7/2000 | |
| JP | 2537547 | 8/1996 | |

* cited by examiner

*Primary Examiner*—Marcus Charles
(74) *Attorney, Agent, or Firm*—Orum & Roth LLC (57) ABSTRACT

In an auto tensioner, a high pressure oil chamber sectioned by a leading end portion of a cylinder and a plunger is provided within the cylinder. A gas chamber and an oil reservoir chamber are sectioned in a sealed manner in an outer periphery of the cylinder and the plunger. A first oil passage communicating the gas chamber with the high pressure oil chamber is provided within the plunger. A second oil passage communicating the high pressure oil chamber with the oil reservoir chamber is provided in the cylinder. The first oil passage is provided with a pressure side damping force generating means, (an orifice hole) and a first check valve closing during expansion. A second check valve closing during compression is provided in the second oil passage, and a locking means (an electromagnetic valve) closing the first check valve is provided.

10 Claims, 7 Drawing Sheets

AUTO TENSIONER

CROSS REFERENCE TO RELATED APPLICATION AUTO TENSIONER

This application claims priority of Application number 2003-328905 filed on 19 Sep. 2003 filed with the Japanese Patent and Trademark Office.

BACKGROUND OF THE INVENTION

1. Field of the Invention

The present invention relates to an auto tensioner applying a tensile force to a belt or a chain which is provided in a tensioned state between a drive wheel and a driven wheel.

2. Description of the Related Art

In order to apply the tensile force to the belt or the chain (hereinafter, referred to as the belt), when the tensile force of the belt is suddenly increased and a plunger is going to be compressed, the auto tensioner generates a damping force against the compression. When the tensile force of the belt is suddenly reduced and the plunger is going to be expanded, the auto tensioner acts to expedite the expansion.

Further, there is a hybrid vehicle structured such that two driving sources comprising an engine and an electric motor are served by one belt, whereby the driving sources are appropriately changed. In the hybrid vehicle mentioned above, there is a structure in which an auto tensioner adjusting a tensile force of the belt is arranged at a position in a downstream side of the engine and an upstream side of the electric motor. However, in the case that the engine is started by the electric motor under the engine stop state, the auto tensioner operates so as to compress, and slipping is generated in the belt. Accordingly, in order to inhibit the belt from being slipped, it is necessary to lock a compression stroke of the auto tensioner.

However, in the conventional auto tensioner (Japanese Patent No. 2537547), since a damping force in a pressure side is generated by circulating a working fluid in a high pressure oil chamber through an annular gap between an inner periphery of a cylinder and a plunger, it is impossible to close the annular gap. Accordingly, it is difficult to provide the lock mechanism of the compression stroke.

Further, in the other conventional auto tensioner (Japanese Patent Application Laid-open No. 1-106924), in order to hold a belt transmission under a preload based on operation of an electromagnetic valve during reverse rotation of the engine, a shock absorber for locking a compression stroke of a piston rod is employed. However, in the auto tensioner, the piston rod is fixed in a position when the shock absorber is compression locked, so that the auto tensioner cannot expand the piston rod so as to absorb slack of the belt, when the belt is further loosened.

In this case, in Japanese Patent Application No. 2002-318933, the applicant of the present invention has proposed an auto tensioner in which a plunger is slidably inserted into a cylinder. The cylinder is mounted to a stationary member side positioned in an upper side. The plunger is mounted to a pulley side positioned in a lower side. A high pressure oil chamber sectioned by the cylinder and a pressure applying portion of the plunger is formed within the cylinder. An outer tube sectioning an oil reservoir chamber having a gas chamber in an upper portion is provided in an outer periphery of the plunger and the cylinder. A first oil passage communicating the gas chamber with the high pressure oil chamber is provided in an upper portion of the cylinder. A second oil passage communicating the high pressure oil chamber with the oil reservoir chamber is provided in the plunger. The first oil passage is provided with an orifice hole and a first check valve performing a closing operation during expansion, and the second oil passage is provided with a second check valve performing a closing operation during compression.

However, according to the auto tensioner proposed by the applicant of the present invention, since the orifice hole provided in the first oil passage in the upper portion of the cylinder so as to structure the pressure side damping force generating means is positioned in the upper side with respect to an oil surface of the high pressure oil chamber, a delay or insufficiency is generated in sucking the working fluid to the high pressure oil chamber, so that air exists in the upper portion of the high pressure oil chamber. It is impossible to sufficiently damp a tensile force fluctuation in a high frequency area of the belt.

SUMMARY OF THE INVENTION

An object of the present invention is to provide an auto tensioner of an erecting type structured such that a cylinder is arranged in a lower side and a plunger sliding within the cylinder is arranged in an upper side, in which more compression can be locked in a compressing direction while allowing expansion in an expanding direction. This invention facilitates securely absorbing slack of a belt.

Another object of the present invention is to provide an auto tensioner which can damp a tensile force fluctuation in a high frequency area of the belt or the like.

The present invention relates to an auto tensioner provided between a side of a stationary member and a side of a pulley, and applying a tensile force to a belt. A plunger corresponding to an upper side is slidably inserted into a cylinder corresponding to a lower side via a seal member. A high pressure oil chamber sectioned by the cylinder and a leading end portion of the plunger is formed within the cylinder. An oil reservoir chamber forming a gas chamber in an upper portion is sectioned in a sealed manner in an outer periphery of the cylinder and the plunger. A first oil passage communicating the gas chamber with the high pressure oil chamber is provided within the plunger. A second oil passage communicating the high pressure oil chamber with the oil reservoir chamber is provided in the cylinder. The first oil passage is provided with a pressure side damping force generating means and a first check valve closing during expansion. A second check valve closing during compression is provided in the second oil passage. The first oil passage is provided with a locking means which operates based on an external input signal and which closes the first check valve.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings.

DESCRIPTION OF THE PREFERRED EMBODIMENTS

Embodiment 1

A hydraulic auto tensioner 10 is provided, for example, between a stationary member such as an engine block or the like and an idle pulley in a hybrid vehicle. The hydraulic auto tensioner applies a tensile force to a belt provided in a tensioned manner between a drive wheel and a driven wheel by pressing the idle pulley to the belt.

Figure 1:
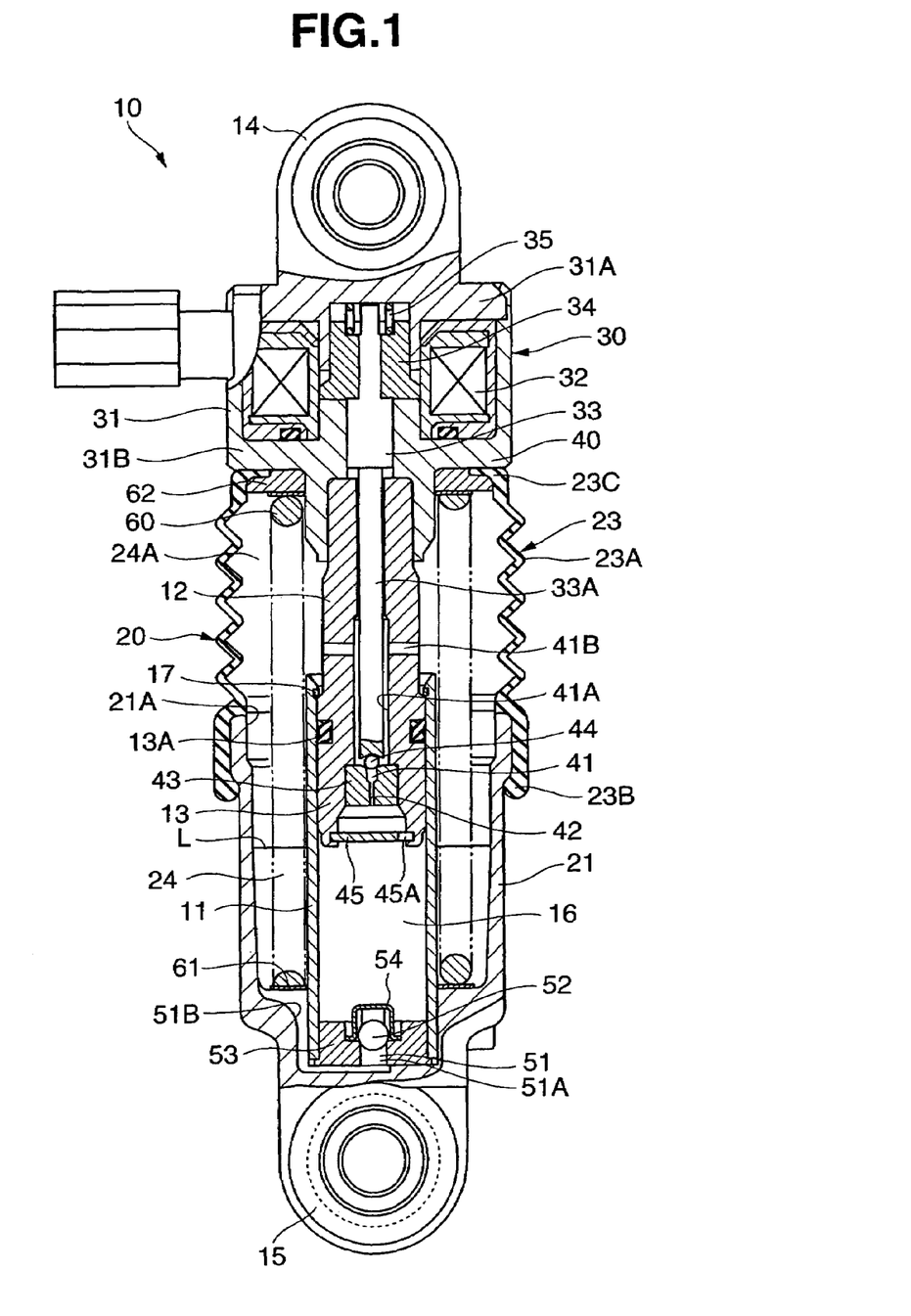
FIG. 1 is an entire cross sectional view showing an auto tensioner according to an embodiment 1.
Figure 2:
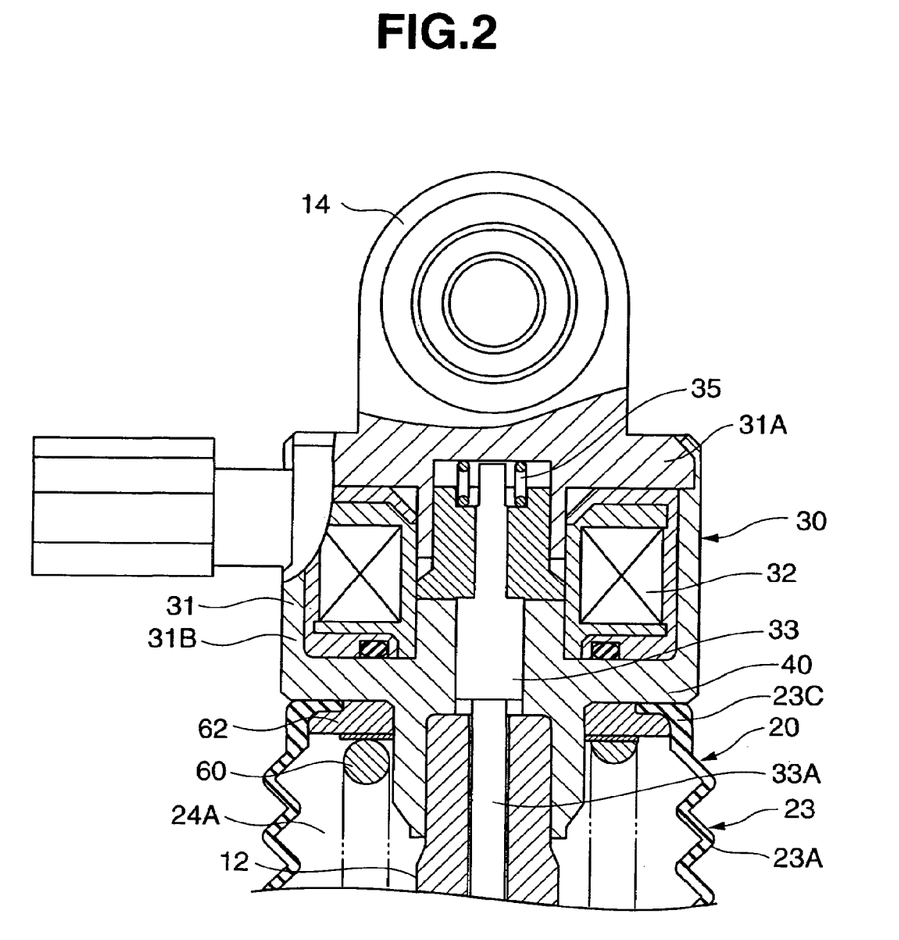
FIG. 2 is an enlarged view of an upper portion in FIG. 1.
Figure 3:
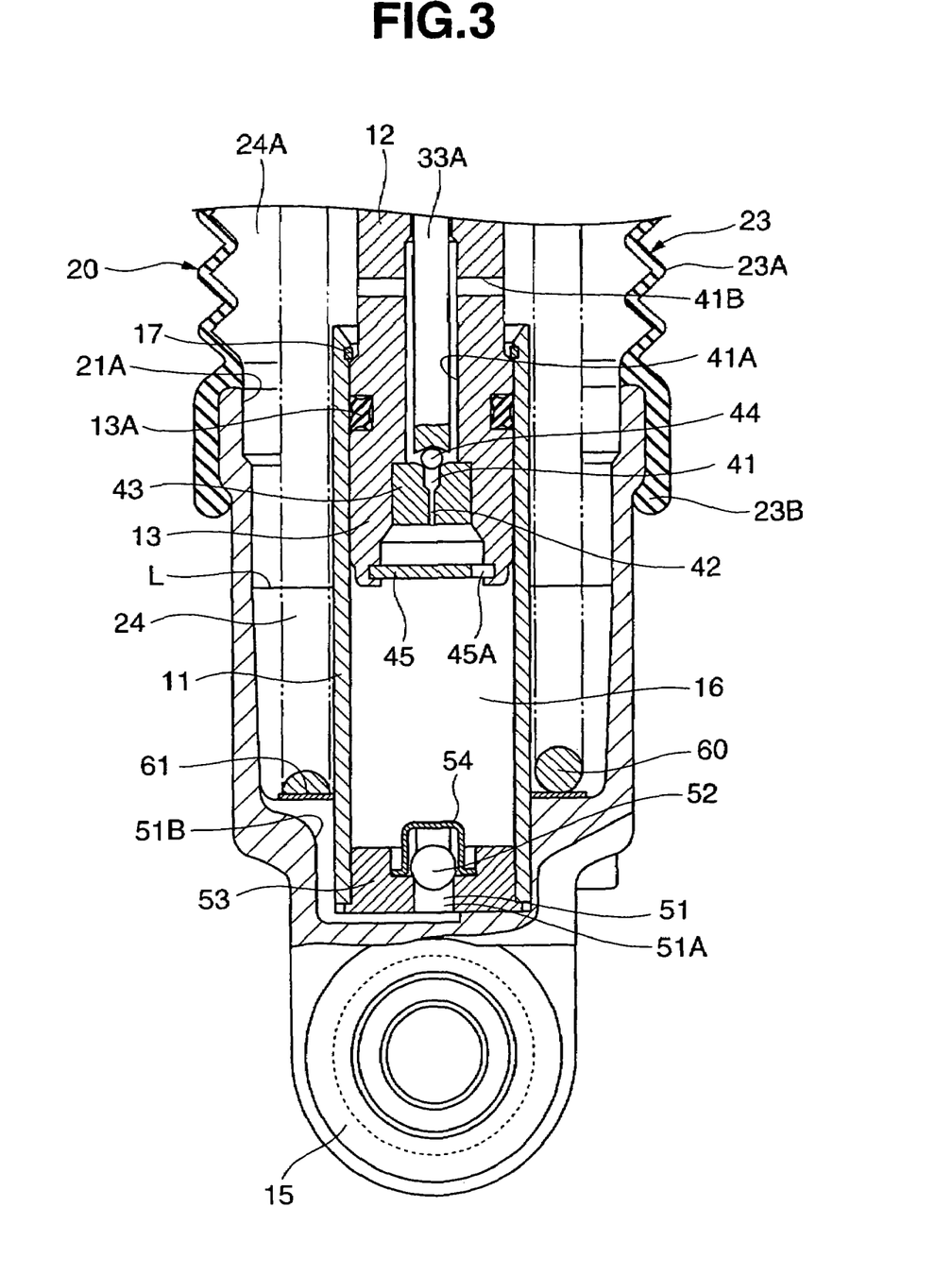
FIG. 3 is an enlarged view of a lower portion in FIG. 1.

The auto tensioner 10 is used by slidably inserting a pressure application portion 13 provided with a piston ring 13A (a seal member) of a plunger 12 to an inner portion of a cylinder 11, mounting the cylinder 11 arranged in a lower side in a vertical direction to a side of a stationary member, and mounting an idle pulley to a side of the plunger 12 arranged in an upper side, as shown in FIGS. 1 to 3. The plunger 12 is fixed to a housing 31 of an electromagnetic valve 30 mentioned below, and is provided with a mounting member 14 in an upper portion of the electromagnetic valve 30. The cylinder 11 is provided with a mounting member 15 in a lower portion.

The auto tensioner 10 forms a high pressure oil chamber 16 sectioned by the cylinder 11 and the pressure application portion 13 of the plunger 12, within the cylinder 11. The plunger 12 structures the pressure application portion by the plunger 12 itself. A leading end portion (a lower end portion) of the plunger 12 is formed to have a slightly larger diameter than that of a base end portion (an upper end portion). This large diameter portion is formed as the pressure application portion 13 which is in slidable contact with an inner periphery of the cylinder 11. The plunger 12 is engaged with a stop ring 17 attached to an inner periphery of an upper end opening of the cylinder 11 in an axial direction by a step end face close to a base end portion (a small diameter portion) of the pressure application portion 13. This structure facilitates regulating an expansion end. When compressing the plunger 12, an outer periphery of a base end portion coming next to the pressure application portion 13 of the plunger 12 forms an annular gap between the outer periphery of the base end portion and the inner periphery of the cylinder 11. However, this annular gap constitutes a part of an oil reservoir chamber 24 mentioned below.

In this case, the plunger 12 may be structured such that an entire portion entering into the cylinder 11 at a high compressing time is formed as a large diameter portion being in slidable contact with the inner periphery of the cylinder 11. The stop ring 17 provided in the inner periphery of the lower end opening in the cylinder 11 is omitted.

The auto tensioner 10 is provided with a casing 21 which is integrally formed with a mounting member 15 which is fixed to a lower portion of the cylinder 11 by a caulking step or the like. The casing 21 is open in an upper end portion thereof, and a flexible dust boot 23 is provided between an opening portion 21A of the casing 21 and a housing 31 of an electromagnetic valve 30 in a side of the plunger 12. The dust boot 23 is provided with a bellows portion 23A capable of expanding and contracting in an axial direction. A lower engagement convex portion 23B is attached in a liquid tight manner to an annular recess portion in an outer periphery of the casing 21. An upper engagement convex portion 23C is attached in a liquid tight manner to a portion between the housing 31 and a spring seat 62 mentioned below. An outer tube 20 is formed by the casing 21 and the dust boot 23. In the auto tensioner 10, a space sealed between the outer tube 20, and the cylinder 11 and the outer periphery of the plunger 12 is formed as an oil reservoir chamber 24 (an oil surface L). An upper portion of the oil reservoir chamber 24 is formed as a gas chamber 24A. The bellows portion 23A of the dust boot 23 absorbs the expansion and contraction of the plunger 12.

In this case, the outer tube 20 is attached to a side of the plunger 12 and a side of the cylinder 11 respectively by upper and lower base end portions. The outer tube comprises the dust boot expanding and contracting in the axial direction. Accordingly, it is not essential to employ the casing 21 together therewith.

The auto tensioner 10 is structured such that an iron housing 31 of the electromagnetic valve 30 is fixed in a liquid tight manner to an upper portion of the plunger 12 by a caulking step or the like. The housing 31 of the electromagnetic valve 30 is an assembled body comprising upper and lower housings 31A and 31B. In the housing 31, the upper housing 31A is set to the mounting member 14. The plunger 12 is fixed to the lower housing 31B. The engagement convex portion 23C of the dust boot 23 is clamped between the lower housing 31B and the spring seat 62.

In the auto tensioner 10, the housing 31B of the electromagnetic valve 30 to which the upper portion of the plunger 12 is fixed is formed as a partition wall member 40 sectioning the gas chamber 24A. The plunger 12 forms a first oil passage 41 communicating the high pressure oil chamber 16 with the gas chamber 24A. The first oil passage 41 comprises a vertical hole 41A which is open to the high pressure oil chamber 16, and a transverse hole 41B which is communicated with a middle portion of the vertical hole 41A in a crossing manner and is open to the gas chamber 24A. A valve seat 43 provided with an orifice hole 42 (a pressure side damping force generating means) is press fit to the vertical hole 41A in a leading end portion of the plunger 12. A seat surface of the orifice hole 42 is provided with a first check valve 44 comprising a ball valve. The orifice hole 42 corresponding to the pressure side damping force generating means is provided in a leading end side of the plunger 12 in the oil or close to the oil surface of the high pressure oil chamber 16. Further, the first check valve 44 which is provided between the orifice hole 42 and the gas chamber 24A, carries out a closing operation when the plunger 12 is expanded, and carries out an opening operation when the plunger 12 is compressed.

In this case, a washer 45 provided with a notch-shaped communication passage 45A in a part of an outer peripheral edge is held by a caulking step to the leading end surface of the plunger 12 and an opening portion of the vertical hole 41A in which the valve seat 43 faces the high pressure oil chamber 16. The notch-shaped communication passage 45A of the washer 45 freely circulates the working fluid in the high pressure oil chamber 16 with respect to the orifice hole 42, and is placed in a side forming the oil surface within the high pressure oil chamber 16 when the auto tensioner 10 is inclined. This structure facilitates easily draining the mixed bubbles in the high pressure oil chamber 16 toward the gas chamber 24A.

The electromagnetic valve 30 is structured such that a solenoid 32 is arranged in an inner portion of the housing 31. A stainless steel pushing element 33 is arranged in a center portion of the solenoid 32. A steel collar 34 is fixed to an upper end portion of the pushing element 33 by press fitting or the like. A lower end portion of the pushing element 33 is abutted against a pushing rod 33A inserted into a vertical hole 41A. The lower end portion of the pushing rod 33A can be brought into contact with the first check valve 44.

The auto tensioner 10 is structured such that in the electromagnetic valve 30, the pushing element 33 and the collar 34 backup supports a coil spring (an energizing means) 35 loaded into a recess portion between the collar 34 and the pushing element 33 provided in the upper end side of the collar 34 by the housing 31A. An energizing force of the spring 35 is applied to the first check valve 44 from the pushing element 33 and the pushing rod 33A. The first check valve 44 is seated on the seat surface 43 when the plunger 12 is expanded, whereby the auto tensioner 10 closes the first check valve 44.

In the auto tensioner 10, the electromagnetic valve 30 is structured as a lock means which is operated based on an input signal and which closes the first oil passage 41. That is, in the auto tensioner 10, if it is necessary to lock the plunger 12 so that the plunger 12 is not compressed more in the middle of the compression stroke in order to inhibit the belt from slipping, the input signal for locking is applied and the electromagnetic valve 30 is energized. In this manner, the pushing element 33 moving to the lower side closes the first check valve 44 and closes the first oil passage 41.

The auto tensioner 10 is provided with a second oil passage 51 communicating the high pressure oil chamber 16 with the oil reservoir chamber 24 in the cylinder 11, and is provided with a second check valve 52 closing during compression of the plunger 12 and opening during expansion in the second oil passage 51. The second oil passage 51 comprises a hole 51A provided in a valve seat 53 press fit to the lower end portion of the cylinder 11 and a groove 51B provided in a casing 21 fixed to the lower portion of the cylinder 11. The second check valve 52 comprises a ball valve, and is provided in a seat surface of the valve seat 53. The second check valve 52 is prevented from dropping out toward an outer side by a cage-shaped valve stopper 54 provided around the seat surface of the valve seat 53, and is moved close to or apart from the seat surface of the valve seat 53.

The auto tensioner 10 is provided with a coil spring 60 which is interposed between a spring seat 61 formed in the casing 21 and a spring seat 62 backup supported to the housing 31 (31B). The auto tensioner 10 energizes the cylinder 11 and the plunger 12 in an expanding direction, in an inner portion of the oil reservoir chamber 24 formed between the outer tube 20, and the cylinder 11 and the plunger 12.

The auto tensioner 10 operates in the following manner.

(1) The auto tensioner 10 presses the idle pulley against the belt based on the energizing force of the coil spring 60, and applies a predetermined tensile force to the belt.

(2) Since the first check valve 44 is closed when the tensile force of the belt is suddenly reduced, and the plunger 12 is going to be expanded by the coil spring 60, the high pressure oil chamber 16 becomes a negative pressure. However, the second check valve 52 is immediately opened, and the oil in the oil reservoir chamber 24 is quickly supplied to the high pressure oil chamber 16.

(3) When the tensile force of the belt is suddenly increased and the plunger 12 is going to be compressed by the belt, the second check valve 52 is closed. The high pressure oil chamber 16 then attains a relatively high pressure. The oil in the high pressure oil chamber 16 at high pressure pushes and opens the first oil passage 41 provided in the plunger 12 and the first check valve 44 of the orifice hole 42, and flows to the oil reservoir chamber 24 from the first oil passage 41 and the orifice hole 42. This generates the pressure side damping force. In this case, at this compression stroke time, bubbles stored in the upper portion of the high pressure oil chamber 16 are discharged to the gas chamber 24A in the outer periphery of the cylinder 11 through the first oil passage 41.

In the auto tensioner 10, if it is necessary to lock the compression stroke of the plunger 12 in the middle of compression in order to inhibit the belt from slipping, the pushing element 33 is operated by energizing the solenoid 30 based on the input signal. This stops the valve opening of the first check valve 44 in the item (3) mentioned above. Accordingly, both the second check valve 52 and the first check valve 44 are closed. The oil in the high pressure oil chamber 16 is closed so as to lock the compression stroke of the plunger 12.

According to the present embodiment, the following operation and effects can be achieved.

(a) The plunger 12 corresponding to the upper side is slidably inserted into the cylinder 11 corresponding to the lower side via the piston ring 13A. The oil reservoir chamber 24 having the gas chamber 24A in the upper portion is sectioned in a sealing manner in the outer periphery of the cylinder 11 and the plunger 12. The first oil passage 41 communicating the gas chamber 24A with the high pressure oil chamber 16 is provided within the plunger 12. The first oil passage 41 is provided with the orifice hole 42 corresponding to the pressure side damping force generating means. The first check valve 44 carries out the closing operation during expansion.

Accordingly, the following effects can be obtained.

(1) The pressure side damping force generating means can be provided in the first oil passage 41 arranged within the plunger 12. It is possible to lock the compression stroke in the auto tensioner 10 of the erecting type.

(2) When the belt is loosened from the time when the compression stroke is locked, the second check valve 52 provided in the second oil passage 51 is opened, and the plunger 12 is expanded. It is thereby possible to securely absorb the slack of the belt.

(b) Since the orifice hole 42 corresponding to the pressure side damping force generating means of the first oil passage 41 is provided in the leading end side of the plunger 12 in the oil or close to the oil surface of the high pressure oil chamber 16, no delay or deficiency is generated in sucking the working fluid to the high pressure oil chamber 16. It is thereby possible to sufficiently damp the tensile force fluctuation in the high frequency vibration area of the belt at a high response.

According to the present embodiment, the following operations and effects can be achieved.

(1) Since the oil reservoir chamber 24 is provided between the outer tube 20 and the base end portion of the cylinder 11, and the second oil passage 51 communicating the oil reservoir chamber 24 with the high pressure oil chamber 16 is provided in the cylinder 11, it is not necessary that the rod guide and the oil seal sectioning the oil chamber in the piston rod side are provided within the outer tube. Therefore, it is possible to reduce the number of the parts and the cost.

(2) The plunger 12 itself is formed as the pressure application portion 13 of the plunger 12. The plunger 12 itself is made to be in slidable contact with the inner periphery of the cylinder 11. The oil reservoir chamber 24 is provided between the casing 21 provided in the side of the cylinder 11 and the cylinder 11. Accordingly, it is possible to omit the piston and to omit the piston rod side oil chamber. It is thereby possible to make the cylinder 11 compact and, to make the outer diameter of the belt tensioner 10 compact.

(3) In comparison with the structure in which the spring 60 is provided in the outer side of the casing 21, it is possible to make the outer diameter of the belt tensioner 10 compact, since the spring 60 energizing the cylinder 11 and the plunger 12 in the expansion direction is provided in the oil reservoir chamber 24 between the cylinder 11 and the casing 21.

(4) Since the spring 60 is provided within the oil reservoir chamber 24, it is not necessary to coat the spring 60 for rust proofing, and it is possible to reduce the cost.

(5) Since the spring 35 corresponding to the energizing means rapidly closes the first check valve 44, it is possible to securely prevent the air from intruding into the high pressure oil chamber 16 from the gas chamber 24A during expansion.

(6) It is possible to change the valve opening load of the first check valve 44 for opening the orifice hole 42 during compression, and change the damping force property during compression, by changing the spring constant of the spring 35 corresponding to the energizing means, and the set load.

(7) The outer tube 20 comprises the casing 21 which is provided in a side of the cylinder 11 and is open in the upper end portion, and the flexible dust boot 23 which is provided between the opening portion of the casing 21 and the side of the plunger 12. Accordingly, since the dust boot 23 can be securely fixed to each of the plunger 12 and the casing 21 and doubles as the seal member for the oil reservoir chamber 24 while absorbing the expansion and contraction of the plunger 12, it is possible to reduce the number of the parts and the cost.

(8) The first oil passage 41 is provided with a lock means (the electromagnetic valve 30) operated based on the external input signal and closing the first oil passage 41. Accordingly, it is possible to inhibit the belt tensioner 10 from being compressed more when the input signal is input. For example, in the hybrid vehicle, even when the drive source is switched from the engine to the electric motor, and the belt tensioner 10 is positioned in the upstream side with respect to the pulley of the electric motor in view of the forward moving direction of the belt, it is possible to reduce the generation of slip between the pulley of the electric motor and the belt, and reduce power loss.

When the belt is further loosened from the position at which the lock is applied to the compression, the second check valve 52 is open. In this manner, the plunger 12 can extend in the expansion direction, so that the plunger 12 is freely extended in the expansion direction and is locked in the compression direction. Therefore, slack of the belt can be securely absorbed.

(9) The first check valve 44 doubles as a function of the lock valve closing the first oil passage 41, in addition to the function of the check valve preventing the air from intruding into the high pressure oil chamber 16 in the inner portion of the cylinder 11 from the gas chamber 24A during expansion. Accordingly, it is possible to reduce the number of the parts without requiring specific parts such as the lock valve. Further, it is possible to securely lock the compression of the plunger 12.

(10) The lock means is formed by the electromagnetic valve 30. Accordingly, the response of the lock means is excellent, and it is possible to lock the compression at an optional position of the compression stroke of the plunger 12.

Embodiment 2

Figure 4:
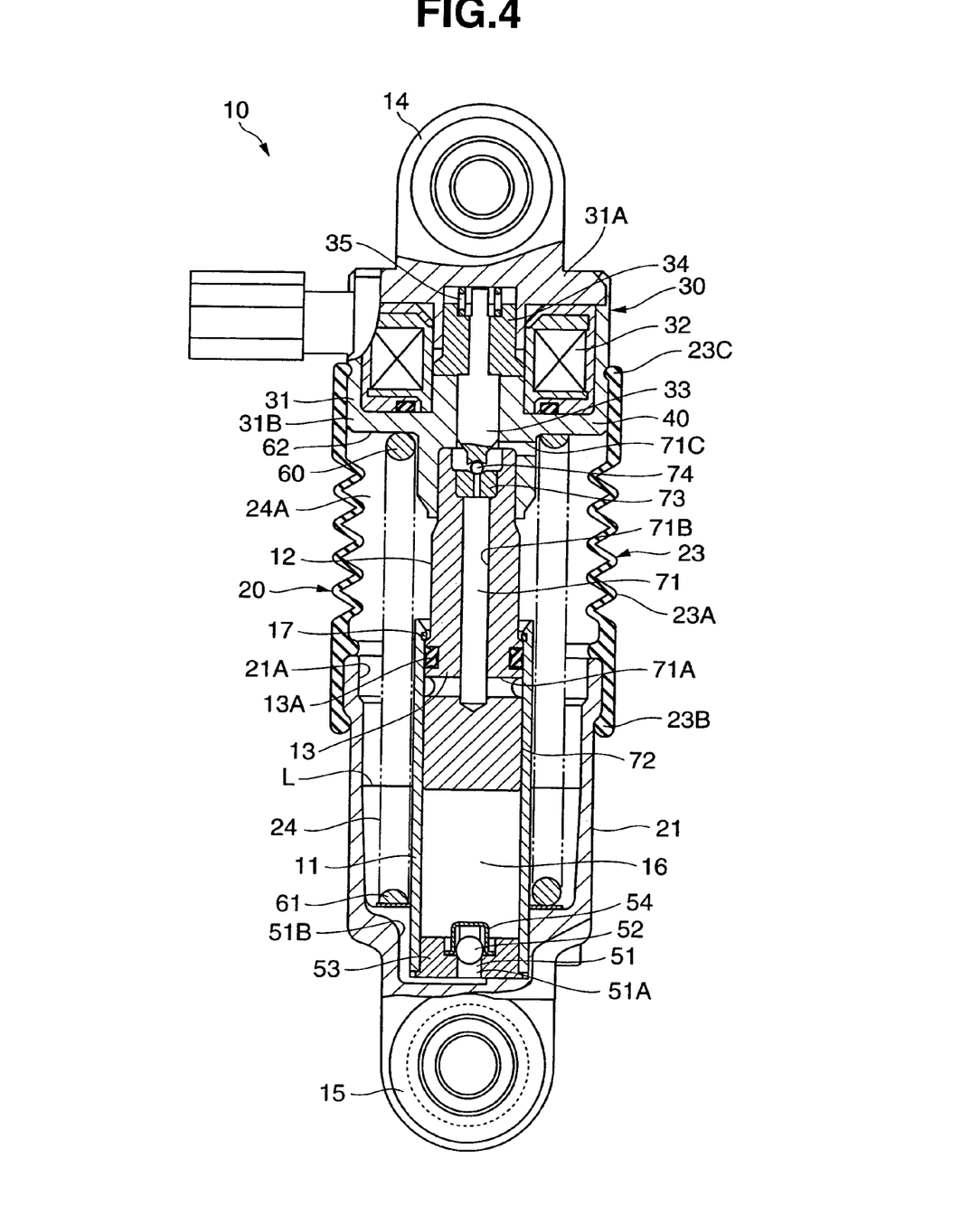
FIG. 4 is an entire cross sectional view showing an auto tensioner according to an embodiment 2.
Figure 5:
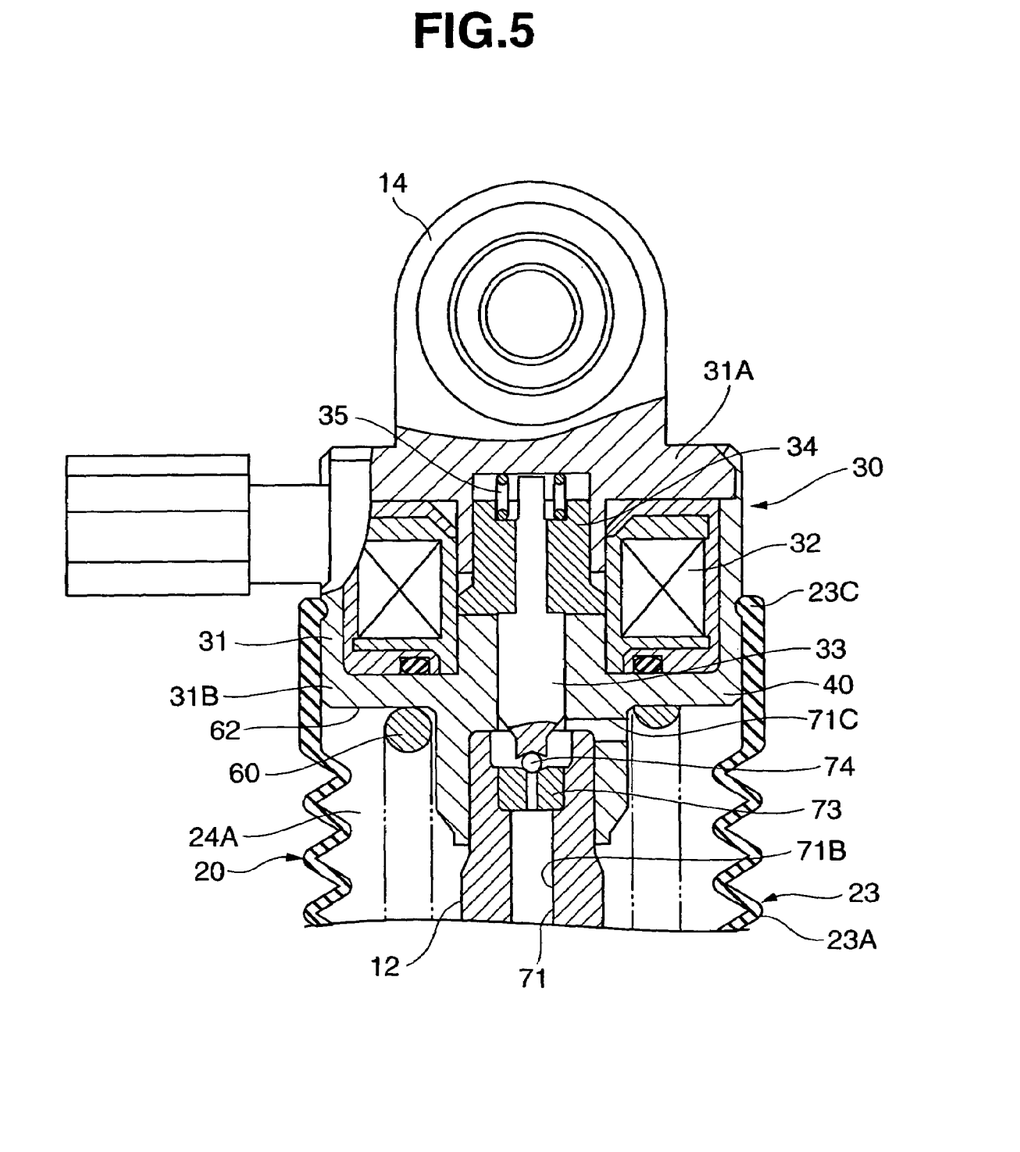
FIG. 5 is an enlarged view of an upper portion in FIG. 4.
Figure 6:
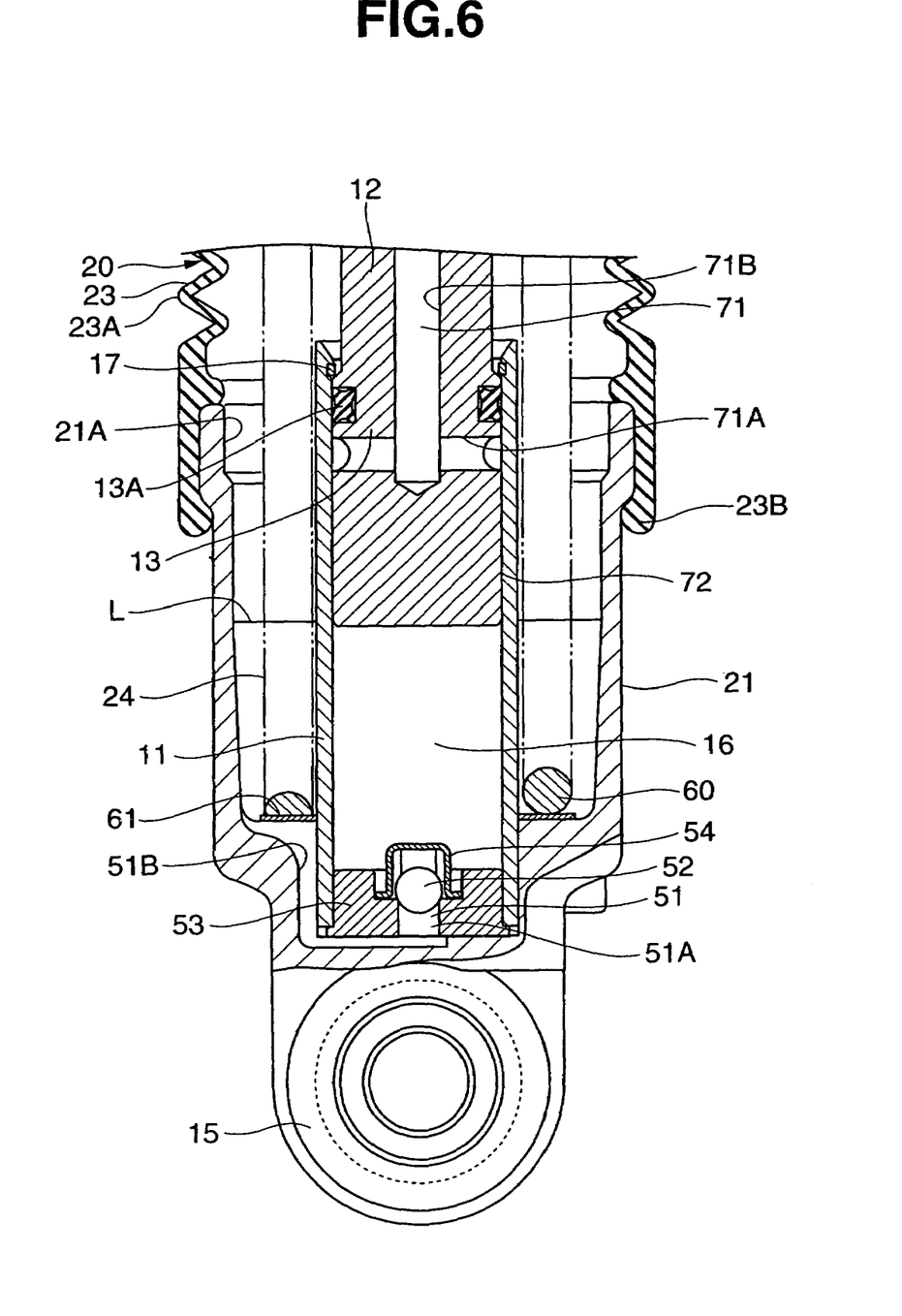
FIG. 6 is an enlarged view of a lower portion in FIG. 4.
Figure 7:
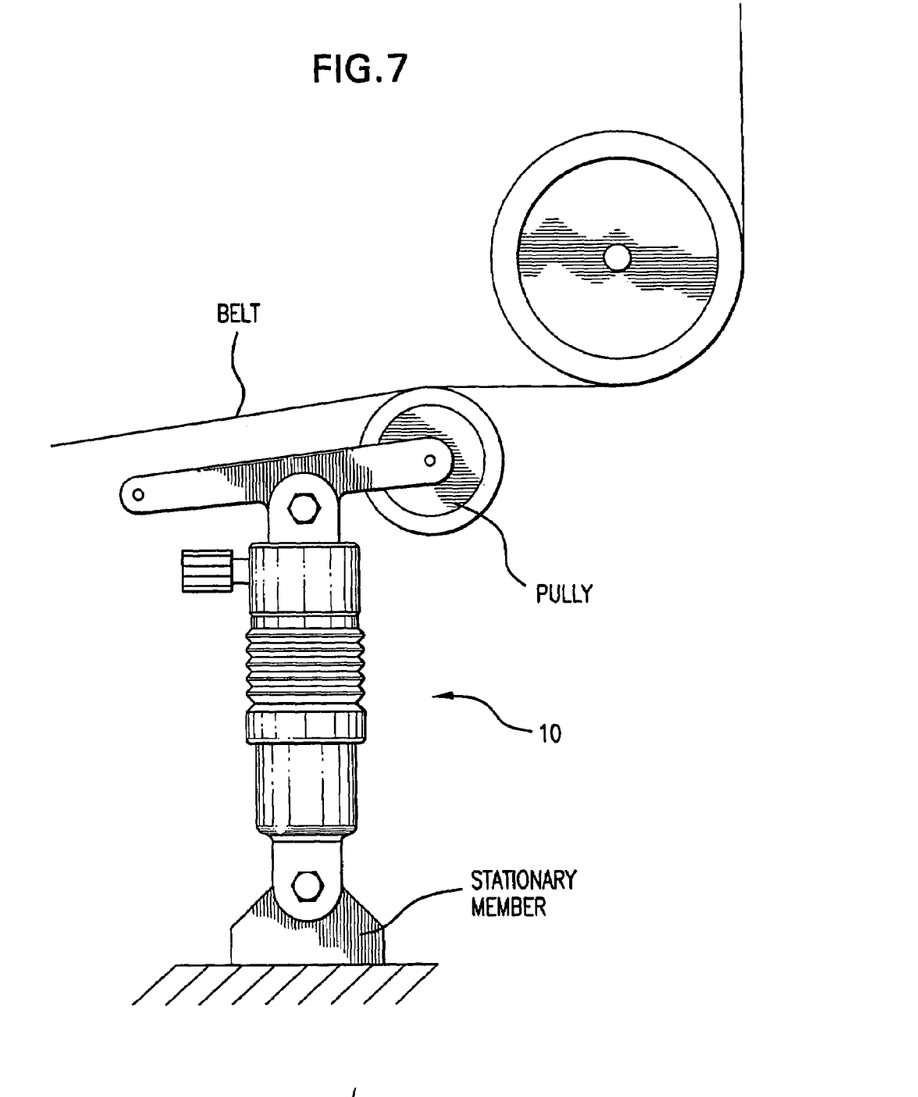
FIG. 7 is a front view of the invention.

The belt tensioner 10 according to the embodiment 2 shown in FIGS. 4 to 6 is different from the belt tensioner 10 according to the embodiment 1 regarding formation of a first oil passage and formation of a pressure side damping force generating means.

In the auto tensioner 10, a first oil passage 71, corresponding to the first oil passage 41 in the embodiment 1, communicating the high pressure oil chamber 16 with the gas chamber 24A comprises a transverse hole 71A pierced in the plunger 12 so as to be open to the outer periphery in the leading end side of the plunger 12. A vertical hole 71B is pierced in the plunger 12 so as to be communicated with the transverse hole 71A in a crossing manner and extend to the upper end surface of the plunger 12 in an axial direction. A transverse hole 71C is pierced in the partition wall member 40 so as to be communicated with the vertical hole 71B in a crossing manner and be open to the gas chamber 24A.

In the auto tensioner 10, the first oil passage 71 is communicated with the high pressure oil chamber 16 via an annular gap 72 formed between an outer periphery in the leading end side of the plunger 12, to which the transverse hole 71A is open, and an inner periphery of the cylinder 11. The annular gap 72 is formed as the pressure side damping force generating means.

In the auto tensioner 10, a valve seat 73 is press fit to the vertical hole 71B open to the upper end surface of the plunger 12. A first check valve 74, corresponding to the first check valve 44 of the embodiment 1, is provided in a seat surface of the valve seat 73. The first check valve 74 carries out a closing operation when the plunger 12 is expanded, and carries out an opening operation when the plunger 12 is compressed.

The electromagnetic valve 30 makes the first check valve 74 carry out the closing operation via the pushing element 33, substantially in the same manner as that of the embodiment 1, and closes the first oil passage 71.

According to the present embodiment, since the pressure side damping force generating means of the first oil passage 71 is formed by the annular gap 72 between the outer periphery in the leading end side of the plunger 12 and the inner periphery of the cylinder 11, it is possible to obtain a more linear damping property with respect to the moving speed of the plunger 12, as compared with the structure in which the pressure side damping force generating means is formed by the orifice hole.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. An auto tensioner provided between a side of a stationary member and a side of a pulley, and applying a tensile force to a belt, comprising:
a plunger corresponding to an upper side slidably insertable into a cylinder corresponding to a lower side via a seal member;
a high pressure oil chamber sectioned by the cylinder and a leading end portion of the plunger formed within the cylinder;
an oil reservoir chamber forming a gas chamber in an upper portion sectioned in a sealed manner in an outer periphery of the cylinder and the plunger;
a first oil passage communicating the gas chamber with the high pressure oil chamber provided within the plunger;
a second oil passage communicating the high pressure oil chamber with the oil reservoir chamber provided in the cylinder;
the first oil passage is provided with a pressure side damping force generating means and a first check valve closing during expansion;
a second check valve closing during compression is provided in the second oil passage; wherein
the first oil passage is provided with a locking means operating in response to an external input signal and acting to close the first check valve.

2. An auto tensioner according to claim 1, wherein the pressure side damping force generating means is provided in a leading end side of the plunger in the oil of the high pressure oil chamber.

3. An auto tensioner according to claim 2, wherein the pressure side damping force generating means is formed by an annular gap between an outer periphery in a leading end side of the plunger and an inner periphery of the cylinder.

4. An auto tensioner according to claim 1, wherein the pressure side damping force generating means is provided close to the oil surface of the high pressure oil chamber.

5. An auto tensioner according to claim 1, wherein the pressure side damping force generating means is formed by an annular gap between an outer periphery in a leading end side of the plunger and an inner periphery of the cylinder.

6. An auto tensioner according to claim 1, wherein the first oil passage comprises a vertical hole open to the high pressure oil chamber, and a transverse hole communicated with a middle portion of the vertical hole in a crossing manner and being open to the gas chamber.

7. An auto tensioner according to claim 6, wherein a valve seat provided with an orifice hole corresponding to the pressure side damping force generating means is press fit to the vertical hole in the leading end portion of the plunger, and the first check valve constituted by a ball valve is provided in a seat surface of the orifice hole.

8. An auto tensioner according to claim 7, wherein a washer provided with a notch-shaped communication passage in a part of an outer peripheral edge is held by a caulking means in a leading end surface of the plunger and in an opening portion of the vertical hole in which the valve seat faces the high pressure oil chamber.

9. An auto tensioner according to claim 1, wherein the lock means comprises an electromagnetic valve operated according to an external input signal.

10. An auto tensioner according to claim 1, wherein the second oil passage comprises a hole provided in a valve seat press fit to a lower end portion of the cylinder, and a groove provided in a casing fixed to a lower portion of the cylinder, the second check valve comprises a ball valve which is provided in the seat surface of the valve seat, is prevented from dropping out toward an outer side by a valve stopper provided around the seat surface of the valve seat, and is movable with respect to the seat surface of the valve seat.

* * * * *